United States Patent [19]

Wilhelm et al.

[11] Patent Number: 5,085,916
[45] Date of Patent: Feb. 4, 1992

[54] HIGH-PERFORMANCE DIELECTRIC FILM WITH IMPROVED THERMAL STABILITY

[75] Inventors: Thomas Wilhelm, Taunusstein; Gunter Schloegl, Kelkheim; Lothar Bothe, Mainz-Gonsenheim; Guenther Crass, Taunusstein, all of Fed. Rep. of Germany

[73] Assignee: Hoechst Aktiengesellschaft, Frankfurt am Main, Fed. Rep. of Germany

[21] Appl. No.: 407,942

[22] Filed: Sep. 15, 1989

[30] Foreign Application Priority Data

Sep. 15, 1988 [DE] Fed. Rep. of Germany ....... 3831355

[51] Int. Cl.$^5$ .......................... B32B 3/00; B32B 15/08
[52] U.S. Cl. ..................................... 428/156; 428/220; 428/461; 428/523
[58] Field of Search ............... 428/457, 212, 461, 523, 428/220, 156; 361/313

[56] References Cited

U.S. PATENT DOCUMENTS 4,283,453  8/1981  Siefried et al. ...................... 428/212
4,692,837  9/1987  Crass et al. ........................ 361/313

OTHER PUBLICATIONS

Henman, "World Index of Polyolefine Stabilizers," Kogan Page Ltd., London, 1982.

Primary Examiner—Thomas J. Herbert, Jr.
Attorney, Agent, or Firm—Foley & Lardner

[57] ABSTRACT

The extruded, biaxially oriented dielectric film is composed of high-purity electrical film raw material. It is suitable as electrical insulating film in particular as a dielectric in an electrical capacitor, and exhibits improved dielectric properties for this prupose. The film comprises propylene polymers and stabilizers for the propylene polymers. The raw material of the film has an idealized thermo-oxidation temperature in the range from 260° to 300° C., preferably 260° to 280° C. The dielectric film has an idealized thermo-oxidation temperature of 250° to 300° C., in particular 250° to 280° C. The content of organic neutralizing agents, in particular calcium stearate, in the raw material is less than/equal to 100 ppm.

20 Claims, 1 Drawing Sheet

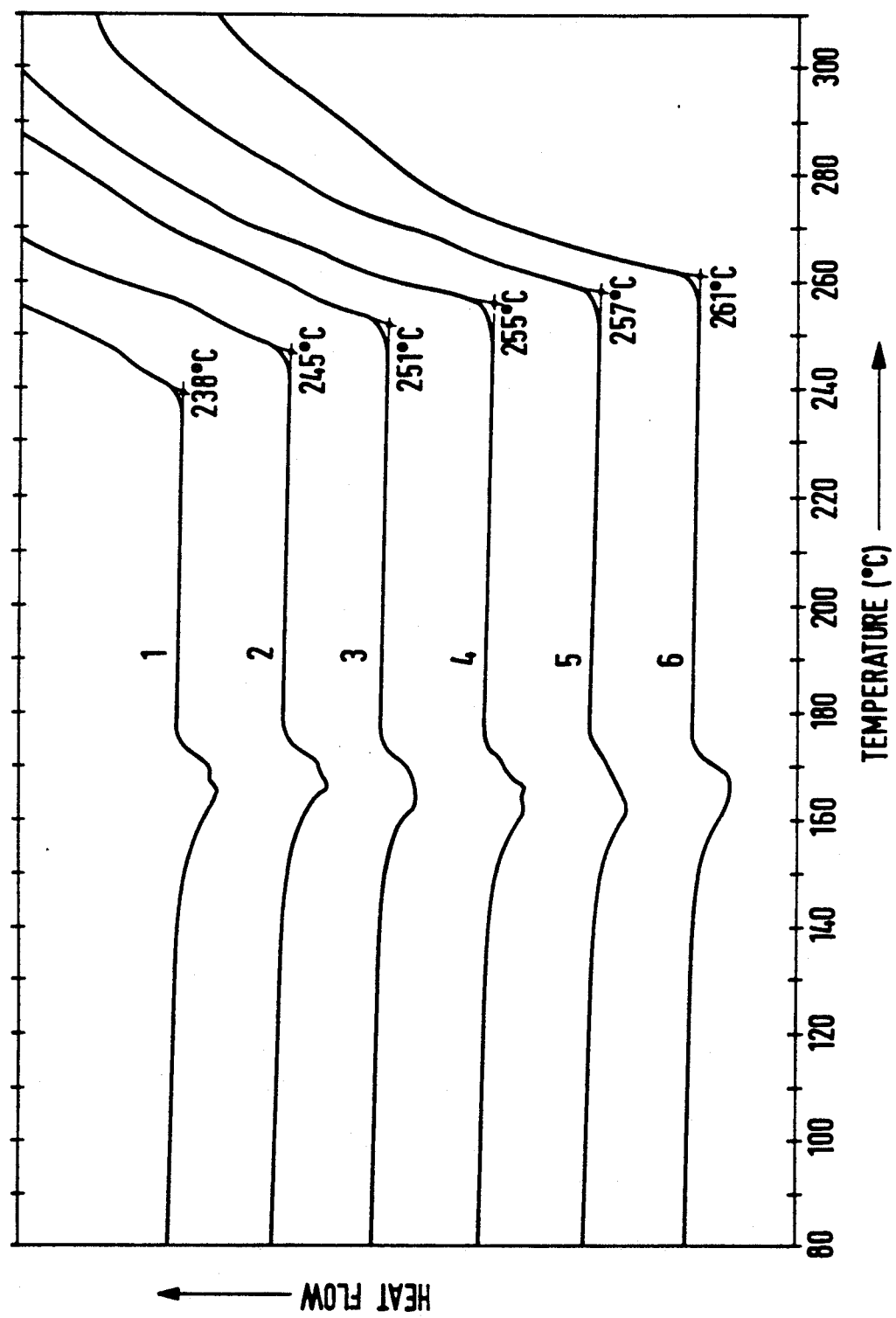

HIGH-PERFORMANCE DIELECTRIC FILM WITH IMPROVED THERMAL STABILITY

BACKGROUND OF THE INVENTION

The present invention relates to a biaxially oriented dielectric film of high-purity electrical film raw material containing propylene polymers and stabilizers for the propylene polymers. The invention further relates to the use of such a film.

The use of plastic films as electrical insulating material has been known for a long time. The films concerned are used both as a dielectric in capacitors and also for cable insulations or as self-adhesive insulating tapes. The requirements imposed on the electrical insulation properties of such films are very high. In addition to a low dielectric loss factor and a high breakdown strength, these characteristic data are required to be precisely constant with time, especially under operating conditions at elevated temperatures.

A series of publications is concerned with biaxially oriented polypropylene films which are said to have a particularly high breakdown strength. The good breakdown strength is generally achieved by using polypropylene raw materials which are said to have quite specific properties.

Thus, EP-A-0,011,796 describes a biaxially oriented polypropylene film for use as electrical insulating film which is composed of two layers and is used in metallized form for producing capacitors. The raw material for said electrical insulating film is high-purity polypropylene which has a residual ash constituent of less than 100 ppm, which is free of organic or inorganic lubricants and which does not contain any ionogenic constituents.

EP-A-0,222,296 has disclosed a coextruded, biaxially oriented multilayer film in which the base layer is likewise composed of high-purity electrical film raw material based on propylene polymers. To improve its electrical properties when used as a dielectric in capacitors, the stabilizer content of the outer layer(s) should be appreciably higher than the stabilizer content of the base layer. In connection with plastic electrical insulating films, stabilizers are to be understood to mean specific compounds which reduce the oxidation phenomena and consequently the dependence of the dielectric loss factor and the electrical breakdown strength on time, if said films are used as a dielectric in conjunction with thin metal layers as electrodes in capacitors. Despite the complicated multilayer structure, the known films still leave something to be desired in relation to the constancy of their dielectric properties, in particular for long-term loading under operating conditions at elevated temperatures.

SUMMARY OF THE INVENTION

Accordingly, it is an object of the present invention to provide a dielectric film which has a simple structure and thus can be produced inexpensively.

Another object of the present invention is to provide a dielectric film which has a low dielectric loss factor and a high breakdown strength.

A further object of the present invention is to provide a dielectric film having dielectric properties which are relatively constant in time for long-term operation at elevated operating temperatures.

In accomplishing the foregoing objectives, there has been provided, in accordance with one aspect of the present invention, a biaxially oriented dielectric film of high-purity electrical film raw material which comprises a propylene polymer and a stabilizer for the propylene polymer, wherein the organic neutralizing agent content of the raw material is less than or equal to 100 ppm and wherein the idealized thermo-oxidation temperature of the film is about 250° to 300° C.

In accordance with another aspect of the present invention there is provided an electrical film capacitor comprising the above-described dielectric film.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by reference to the accompanying drawing by which the FIGURE is a graph of heat flow v. temperature useful in determining film idealized thermo-oxidation temperatures.

DETAILED DESCRIPTION OF THE PREFERRED EMBODIMENTS

The dielectric film according to the invention is produced from a high-purity raw material, i.e. it should be free from lubricants and not contain any ionogenic constituents. The Staudinger index of the raw material is between about 2.4 and 3.8 dl/g, preferably between 2.8 and 3.4 dl/g, and its melting point is between about 160° and 168° C. Preferably, its residual ash content is less than 50 ppm, its chlorine content less than 10 ppm and its content of organic neutralizing agents, in particular calcium stearate, 0 to 0.01% by weight. This raw material is stabilized with a suitable stabilizer system in a manner such that it has an idealized thermo-oxidation temperature (measured with a differential calorimeter with a heating rate of 20 K/min) of between about 260° and 300° C., in particular 260° to 280° C. The stabilization of the dielectric film is adjusted in accordance with the target idealized thermo-oxidation temperatures mentioned, i.e. the necessary amount of stabilizer (concentration) is determined by these target temperatures, but will be different according to stabilizer type. In general, a stabilizer content of about 1.2% by weight is not exceeded, preferably it is in the range from 0.3 to 1.0% by weight and particularly preferably, from 0.4 to 0.8% by weight, based in each case on the total weight of the dielectric film.

The idealized thermo-oxidation temperature of the film is about 250° to 300° C., preferably 250° to 280° C. It is determined in the following manner: 2 to 5 mg of the raw material to be investigated or of the film to be investigated are heated up in a differential calorimeter at a heating rate of 20 K/min. Air is used as flushing gas and the initial temperature is 295K. The drawing shows the change in heat flow with increasing temperature. While this curve first extends virtually horizontally (base line), these values increase considerably as a consequence of oxidation from a certain temperature upwards (exothermic branch). As shown in FIG. 1 of the drawing, the idealized thermo-oxidation temperature is determined from the intersection of the straight line extension of the exothermic branch of the thermogram and the base line.

Surprisingly, it was found that the film having the composition described has a high constancy of the dielectric loss factor with time even at elevated temperatures and under operating conditions. The breakdown strength both for direct and also for alternating voltage loading is very high and remains stable over a long period of time even at elevated temperature. Contrary to expectations, it was found, despite the high stabilization required to achieve the necessary thermal oxidation temperatures, the dielectric loss factor does not become unacceptably high, in particular if the raw material has an ash content of less than 50 ppm, a chlorine content of less than 10 ppm and a content of organic neutralizing agents such as calcium stearate of 0 to 0.01% by weight.

The dielectric film stabilizers are selected from the substance categories of the sterically hindered phenols or mixtures of these substances with phosphites, the first named substance categories being particularly preferred. In particular, polynuclear phenolic stabilizers are used, whose molar mass is advantageously greater than 300 g/mol, in particular greater than 700 g/mol. A comprehensive list of stabilizers for polypropylene is given by T. J. Henman in the publication entitled "World Index of Polyolefin Stabilizers", Kogan Page Ltd., London, 1982.

To produce the dielectric film the polymer melt is extruded through a flat extrusion die, the film obtained by extrusion solidified by cooling, then longitudinally stretched in a ratio of about 4:1 to 7:1 at a temperature of, for example 120° to 150° C. and transversely stretched in a ratio of about 8:1 to 10:1 at a temperature of, for example, 160° to 170° C. Finally, the biaxially stretched film is heat-set, for example, at 150° to 165° C. The process is carried out in a manner such that its peak-to-valley height $R_2$ is less than/equal to 1.5 μm and is, in particular, in the range from 0.07 to 0.5 μm (cutoff 0.08 mm), it being possible for the two surfaces of the film to have the same or different peak-to-valley height.

In addition to polypropylene, it is also possible to use polymer blends composed of polypropylene and other polyolefins as propylene polymers, in particular HDPE, LDPE, LLDPE or poly(4-methyl-1-pentene), the proportion of the other polyolefins usually not exceeding 15% by weight, based on the total weight of the polymer blend. Block copolymers of propylene, in particular with ethylene, or random copolymers of propylene, in particular with ethylene, may also advantageously be used. In the case of the copolymers, the amount of comonomer present in addition to the propylene does not, in general, exceed 10% by weight, based on the copolymer.

The films produced according to the invention are used in metallized polypropylene film capacitors (MPF capacitors), preferably in capacitors for those applications in which a high constancy of the electrical and dielectrical characteristic values with time is required even at elevated temperatures. Such capacitors are, for example, high-performance capacitors having a particularly low capacitance which must, however, be kept constant.

The invention is explained in more detail by the following examples. The idealized thermo-oxidation temperature of the raw material used in the examples is achieved by adding 1,3,5-trimethyl-2,4,6-tris(3,5-di-tert-butyl-4-hydroxybenzyl) benezene (cf. example below) as stabilizer.

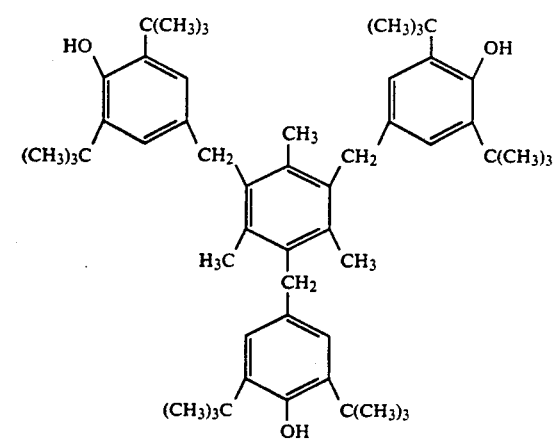

Table I reveals the dependence of the idealized thermo-oxidation temperature on the proportion of this stabilizer in the raw material. The stabilizer content is specified in % by weight, based on the total weight of the raw material. This dependency is further shown in the diagram. In the following examples, raw materials containing this stabilizer were used. The films produced all have a single-layer structure and the percentage data relate to % by weight. The data contained in the table relate only to the properties of the raw materials, and films produced from this raw material have, in general, other thermo-oxidation values.

TABLE I

| Sample No. | Stabilizer Content (%) | Idealized thermo-oxidation temperature (°C.) |
| --- | --- | --- |
| 1 | 0.05 | 238 |
| 2 | 0.10 | 245 |
| 3 | 0.15 | 251 |
| 4 | 0.20 | 255 |
| 5 | 0.25 | 257 |
| 6 | 0.30 | 261 |
| 7 | 0.50 | 270 |

EXAMPLE 1

To produce a biaxially oriented extruded film, use was made of a raw material composed of polypropylene having an idealized thermo-oxidation temperature of about 261° C. The chlorine content of the raw material was 4 ppm and the calcium stearate content was 0.005%. The n-heptane-soluble constituent was 4%. The raw material was extruded through a flat extrusion die, after cooling down, the cast film was stretched in the longitudinal direction and then in the transverse direction and finally heat-set. The film thus obtained had a total thickness of 10 μm. The film was not corona-treated.

The idealized thermo-oxidation temperature of the film was 259° C.

EXAMPLE 2

A biaxially oriented extruded single-layer film was produced in an analogous manner to Example 1. The raw material used had an idealized thermo-oxidation temperature of about 270° C. The chlorine content of the raw material was 4 ppm and the calcium stearate content was less than 0.01%.

The idealized thermo-oxidation temperature of the film was 268° C.

COMPARISON EXAMPLE 1

A biaxially oriented extruded single-layer film was produced in an analogous manner to Example 1. The raw material used was composed of polypropylene and had an idealized thermo-oxidation temperature of about 261° C. The chlorine content was 40 ppm and the calcium stearate content 0.1%.

The idealized thermo-oxidation temperature of the film was 259° C.

COMPARISON EXAMPLE 2

A biaxially oriented extruded single-layer film was produced in an analogous manner to Example 1. The raw material used was composed of polypropylene and had an idealized thermo-oxidation temperature of about 238° C. The chlorine content of the raw material was 4 ppm and the calcium stearate content 0.005%.

The idealized thermo-oxidation temperature of the film was 228° C.

The electrical characteristic parameters of the individual films are contrasted for comparison in Table II.

Key

DZ: the relative permittivity measured at 10 kHz,
tan$\delta$: the dielectric loss factor measured at 10 kHz,
DW: the volume resistance in units of ohm-cm,
$E_{d,0}$: the DC dielectric strength without storage, units kV/mm,
$E_{d,1000}$: the DC dielectric strength after storing for 1000 hours at 120° C., units kV/mm,
$E_D$: the change in the DC dielectric strength in percentage.

The relative permittivity, tan$\delta$ (measured at 10 kHz) and the volume resistance were measured at 120° C. and the breakdown strength at 25° C.

As can be seen from Table II, the film of Comparison Example 1 has a dielectric loss factor which is above the limit of $2.0 \cdot 10^{-4}$ still acceptable for capacitor applications. Just like the breakdown strength of the film of Comparison Example 2, although the dielectric characteristic parameters are outstanding, they deteriorate significantly after storage at elevated temperatures.

On the other hand, Examples 1 and 2 according to the invention have good values both before and after storage over a period of time of 1000 h at 120° C.

The dielectric film described above is used as a dielectric in an electrical film capacitor.

TABLE II

| | Electrical characteristic parameters of the films produced. | | | | | |
|---|---|---|---|---|---|---|
| | DZ | tan$\delta$ | DW | $E_{D,0}$ | $E_{D,1000}$ | $\Delta E_D$ |
| Example 1 | 2.23 | $1.4 \times 10^{-4}$ | $1.5 \times 10^{16}$ | 713 | 650 | 8.8 |
| Example 2 | 2.21 | $1.1 \times 10^{-4}$ | $5.7 \times 10^{15}$ | 688 | 652 | 5.2 |
| Comparison Example 1 | 2.23 | $3.7 \times 10^{-4}$ | $2.3 \times 10^{16}$ | 544 | 530 | 2.5 |
| Comparison Example 2 | 2.24 | $0.9 \times 10^{-4}$ | $4.5 \times 10^{15}$ | 622 | 491 | 25.8 |

What is claimed is:

1. A biaxially oriented dielectric film of high-purity electrical film raw material which comprises a propylene polymer and a stabilizer for the propylene polymer, wherein the organic neutralizing agent content of the raw material is less than or equal to 100 ppm, wherein the stabilizer content of said raw material is less than or equal to about 1.2% by weight, based on the weight of the dielectric film, and wherein the idealized thermo-oxidation temperature of the film is about 250° to 300° C.

2. A dielectric film as claimed in claim 1, wherein the idealized thermo-oxidation temperature is about 250° to 280° C.

3. A dielectric film as claimed in claim 1, wherein said organic neutralizing agent is calcium stearate.

4. A dielectric film as claimed in claim 1, having a residual ash content of less then 50 ppm.

5. A dielectric film as claimed in claim 1, having a chlorine content of less than 10 ppm.

6. A dielectric film as claimed in claim 1, further comprising a metal outer layer.

7. An electrical insulating film comprising a dielectric film as claimed in claim 1.

8. An electrical film capacitor comprising a dielectric film as claimed in claim 1.

9. A dielectric film as claimed in claim 1, having a surface peak-to-valley height $R_Z$ less than or equal to 1.5 $\mu$m, wherein the peak-to-valley height of each of the two surfaces of the film is the same or different.

10. A dielectric film as claimed in claim 9, wherein $R_Z$ is 0.07 to 0.5 $\mu$m.

11. A dielectric film as claimed in claim 1, wherein said stabilizer content is 0.3 to 1.0% by weight.

12. A dielectric film as claimed in claim 11, wherein said stabilizer content is 0.4 to 0.8% by weight.

13. A dielectric film as claimed in claim 1, wherein said raw material for the film comprises high-purity polypropylene, a blend of polypropylene and at least one additional polyolefin, or a block or random copolymer of propylene with at least one additional olefin.

14. A dielectric film as claimed in claim 13, wherein said polyolefin is HDPE, LDPE, LLDPE or poly(4-methyl-1-pentene).

15. A dielectric film as claimed in claim 13, wherein said olefin is ethylene.

16. A dielectric film as claimed in claim 1, wherein said stabilizer is a sterically hindered phenol or phosphite.

17. A dielectric film as claimed in claim 16, wherein said sterically hindered phenol has a molecular weight of at least 300.

18. A dielectric film as claimed in claim 17, wherein said sterically hindered phenol has a molecular weight of at least 700.

19. A dielectric film as claimed in claim 1, having a thickness of about 3 to 30 $\mu$m.

20. A dielectric film as claimed in claim 19, having a thickness of 4 to 15 $\mu$m.

* * * * *